Patented Mar. 6, 1928.

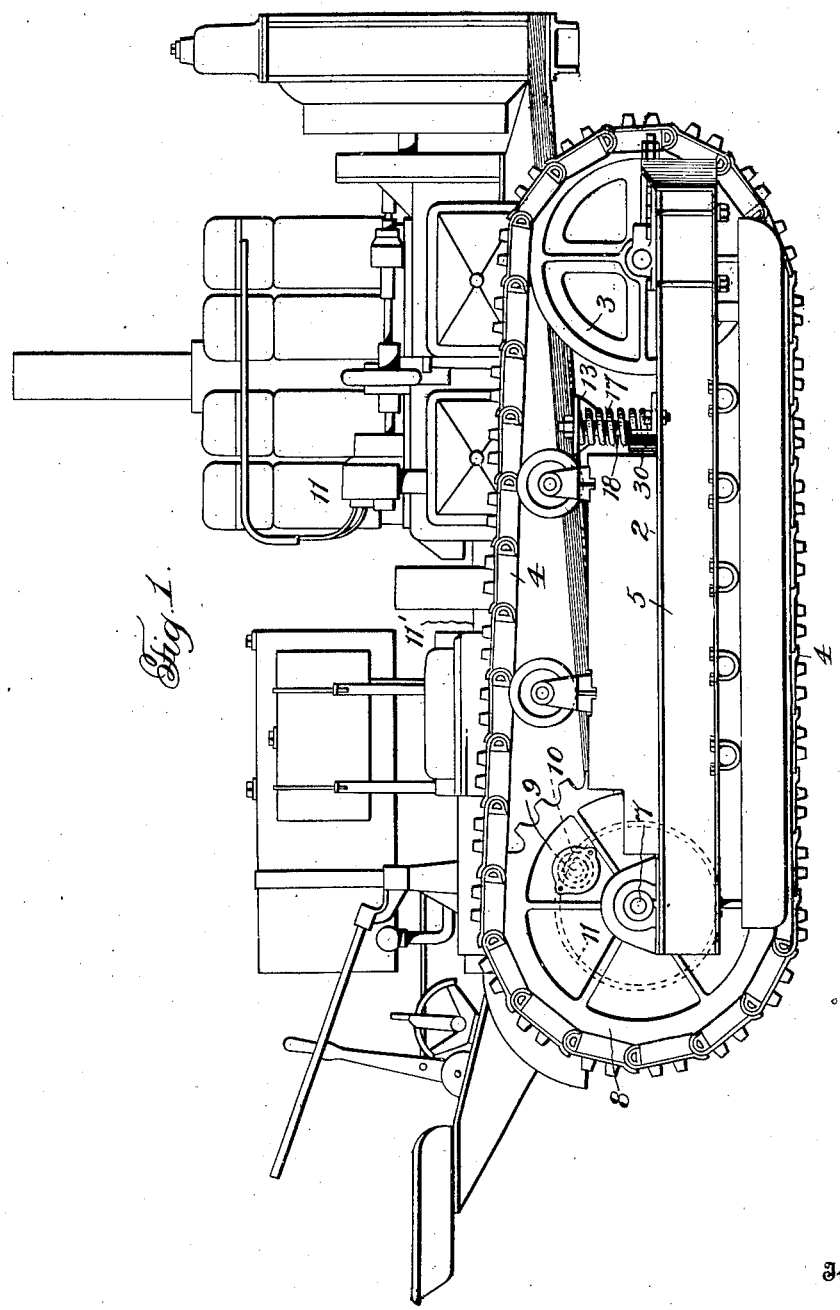

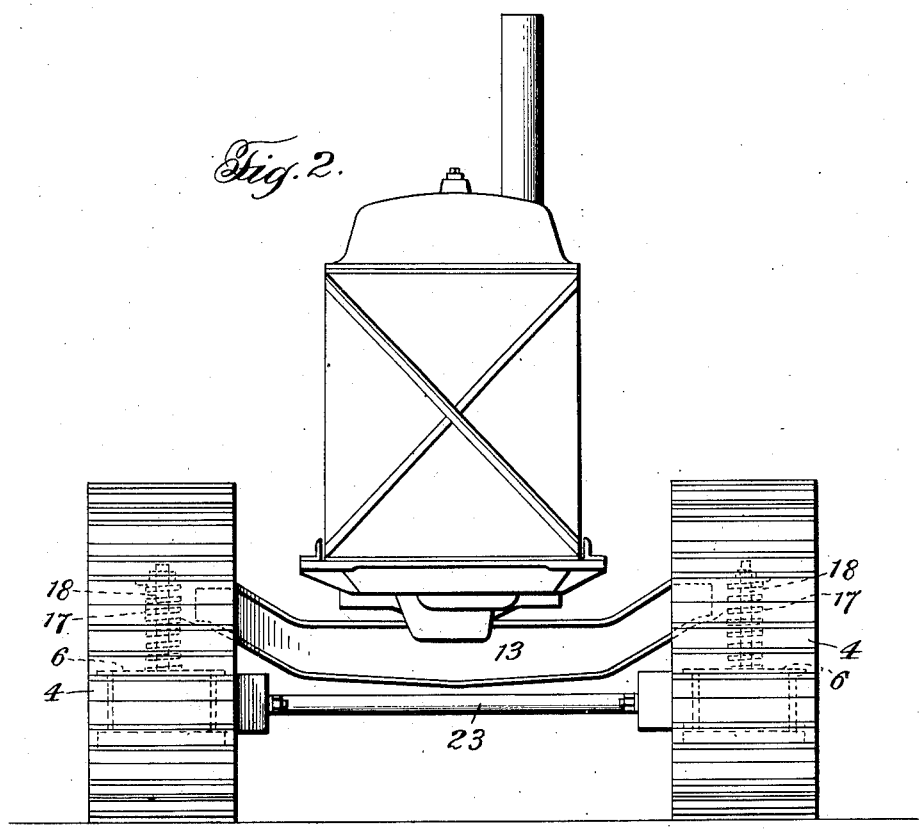

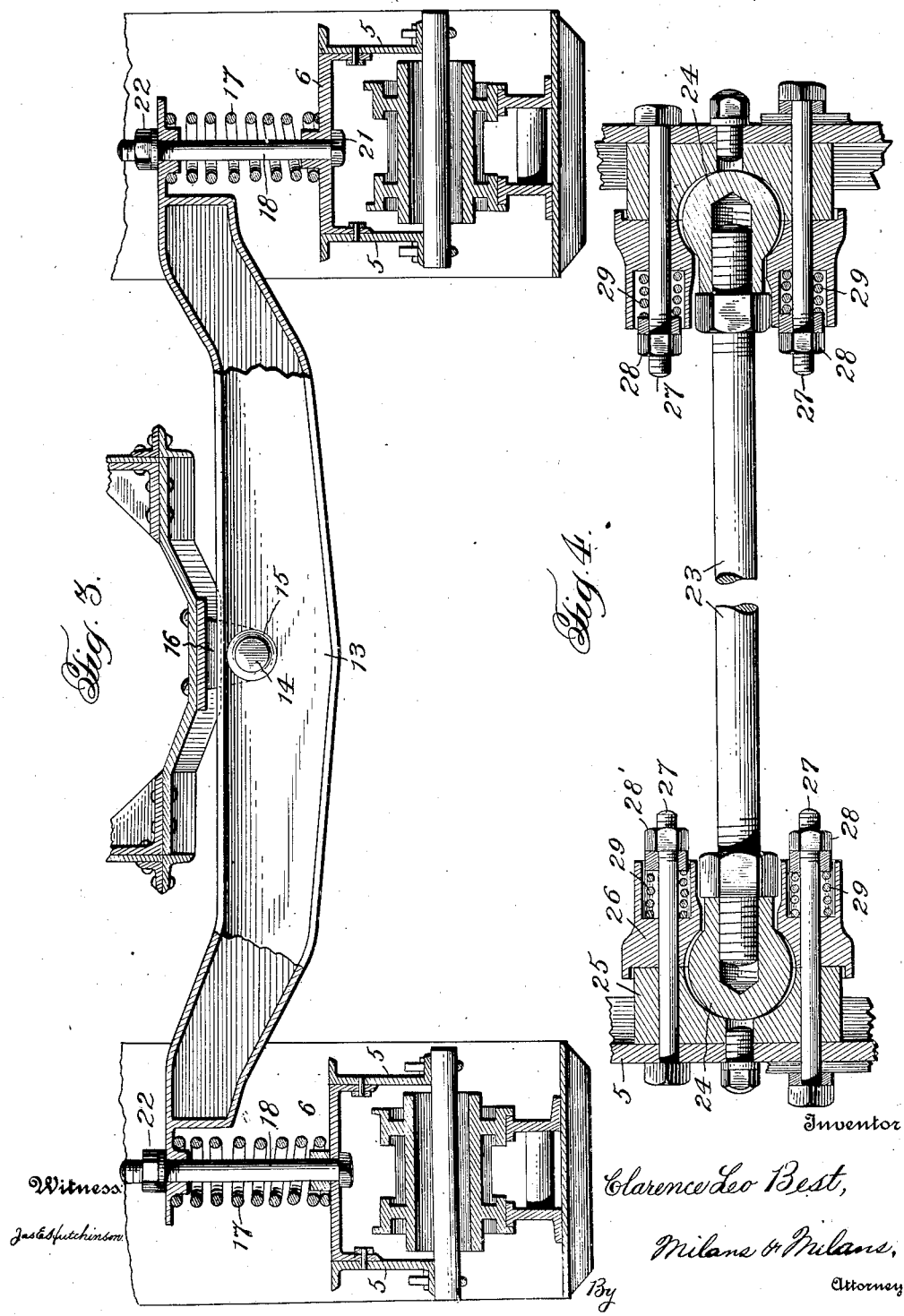

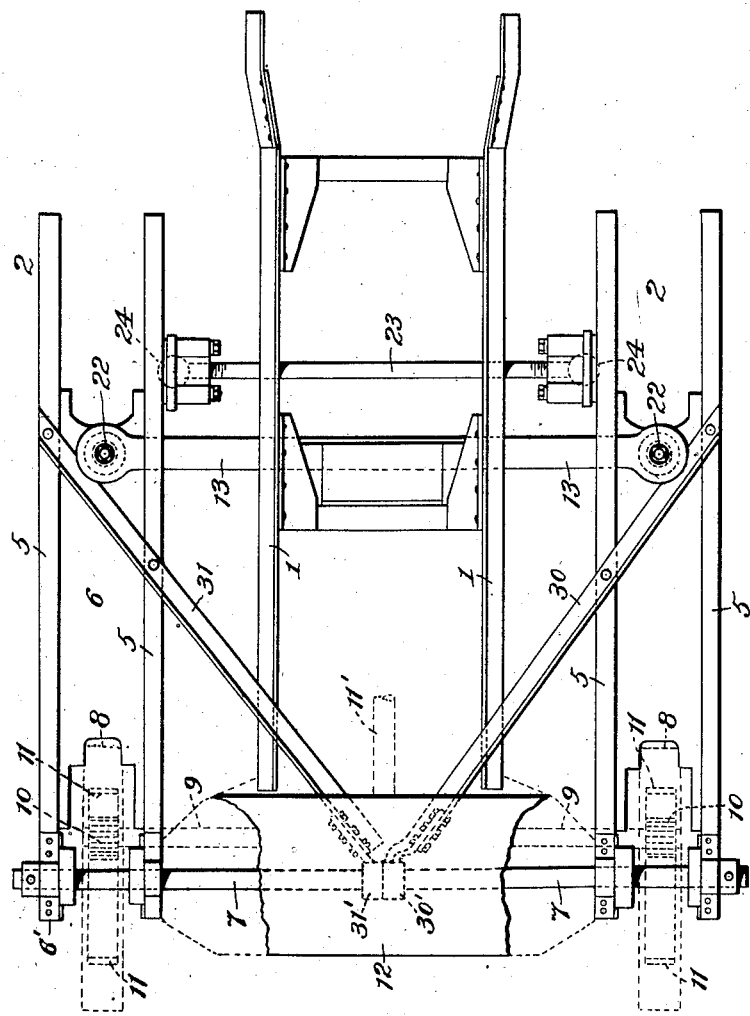

1,661,649

UNITED STATES PATENT OFFICE.

CLARENCE LEO BEST, OF ELMHURST, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA.

TRACTION ENGINE.

Application filed September 15, 1920. Serial No. 410,419.

This invention relates to improvements in traction engines, and more especially to tractors of the type having tractor trucks adapted for vertical oscillation or swinging movement.

The object of the invention is to provide for better functioning of the oscillating trucks, to relieve the parts of strain during turning, and provide a more durable efficient tractor of the type referred to.

The invention comprehends tractor trucks having hinged connections at their rear portions with the rear portion of the main frame, and a rocking equalizer bar or beam connected with the trucks for supporting the main frame at its forward part, the trucks being adapted to oscillate or swing independently of each other.

A particularly important novel characteristic of the invention resides in the provision of a strut between the oscillating trucks, which while permitting of the independent swinging movement thereof, acts to prevent them from toeing together in front and relieves the parts of strain during short turning.

An important feature of the invention also lies in the provision of improved means for preventing the trucks from spreading apart out of their proper alignment, and in the use of said means, and the strut, in combination with the equalizer beam or member, said means and strut cooperating to maintain the proper spaced relation between the trucks so that they and the equalizer bar operate more efficiently to provide the desired flexible support for the main frame, short turning being facilitated, and the parts relieved of strain, resulting in a more durable efficient device.

The invention with other objects and advantages thereof and the particular construction, combinations and arrangement of parts comprising the same will be understood from the following detailed description, when considered in connection with the accompanying drawings forming part thereof and illustrating one embodiment of the invention.

In the drawings:—

Figure 1 is a side elevation of a tractor constructed in accordance with the present invention.

Figure 2 is a partial front end elevation.

Figure 3 is a detail view on an enlarged scale of the equalizer bar and its connections with the main frame and truck frames.

Figure 4 is a detail view on an enlarged scale of the strut and its connections with the truck frames.

Figure 5 is a top plan, certain of the parts being removed for the sake of clearness.

It will, of course, be understood that while in the drawings a specific embodiment of the invention is shown by way of example, the particular construction illustrated may be changed or modified and the invention carried out in other forms, as will appeal to those skilled in the art, and falling within the scope of the appended claims without departing from the spirit of the invention.

In the drawings, 1 designates the main frame of the machine and 2—2 are the tractor trucks extending along opposite sides thereof.

Each tractor truck comprises a truck frame, an idler wheel 3 suitably mounted at the forward end thereof, and an endless track or chain 4 thereon engaging the idler wheel 3, the truck frames being shown as made up of spaced side channels 5 and a top channel bar 6 suitably secured together. The truck frames are pivotally connected at their rear end portions to the rear portion of the main frame 1 so that the other end portions of the truck frames are free to swing in a vertical arc independently of each other, said truck frames having journals 6' engaging an axle 7 suitably secured to the rear portion of the main frame. Journaled upon the axle 7 are driving sprockets 8 for the endless tracks or chains 4, power being transmitted thereto through a transverse driving shaft 9 having pinions 10 at its outer end meshing with internal gears 11 on the driving sprockets 8, said driving shaft being connected with the power shaft 11' of the motor 11 by gearing of conventional form, indicated in a general way by the gear casing 12.

The main frame 1 is supported at its forward part upon the forward portions of the tractor trucks by means of an equalizer bar or member 13, said equalizer bar or member being pivotally connected centrally of its ends to the main frame 1 by a pin 14 engaging bearings 15—16 on the main frame and equalizer member. The end portions of the equalizer bar or member 13 extend over the truck frames, and flexible connections are provided between these parts to provide for sufficient vertical play therebetween. In accordance with the present invention, each of said connections comprise a coiled spring 17 interposed between one end portion of the equalizer member 13 and the top channel 6 of one of the tractor trucks, and a vertical rod or stem 18 extending centrally of the coiled spring 17 and through openings in the end portions of the equalizer bar and the top channel 6 of the truck frame to the upper and under sides thereof, respectively, and having abutments or stops 21—22 at its ends, a resilient universal joint connection being thus provided, the rod or stem 18 slidably engaging the parts and serving to retain them in operative relation.

Interposed between the forward end portions of the tractor trucks is a strut 23 adapted to prevent the trucks from toeing together in front and to relieve the parts of strain while making short turns, suitable flexible connections being provided between the ends of the strut 23 and the truck frames to accommodate for the vertical oscillation of the trucks. The strut 23, in the present instance, is shown in the form of a single rod or bar. The flexible connections between the ends of the strut 23 and the truck frames each comprise a ball 24 on one end of the strut rod and a socket for the ball on the truck frame. The socket is composed of separate parts 25—26 secured to the truck frame by bolts and nuts 27—28, the bolts engaging suitable openings in the socket parts and the inner side channel 5 of the truck frame. The bolts 27 extend a substantial distance beyond the outer face of the socket part 26, and interposed therebetween and the nuts 28 on the inner ends of the bolts 27 are coiled springs 29. The coiled springs 29 act to yieldably maintain the socket part 26 in close relationship to its companion socket member 25, the tension of the coiled springs 29 being such as to permit the socket part 26 to be pulled inwardly away from the socket part 25, and the strut connection to lengthen out sufficiently to compensate for the vertical play of the truck frames relatively to each other.

In order to prevent the trucks from spreading apart out of proper alignment, brace members 30—31 are provided, the brace members being relatively heavy and extending diagonally from the rear end of the main frame forwardly to the truck frames, said braces at their rear ends being provided with collars 30'—31', which loosely engage the axle 7 at the central part thereof, the other end portions of the braces being rigidly secured by suitable means to the inner side channel bars 5 of the truck frames.

The strut 23 affords simple and efficient means for relieving the parts of strain and preventing the toeing in of the front ends of the trucks during turning. Furthermore, the strut operating between the front end portions of the truck frames acts in conjunction with the braces 30 and 31, to always maintain the trucks in proper spaced relation, the proper operative relation between the equalizer bar and trucks being also thus assured, resulting in the most efficient functioning of these parts.

What I claim is:—

1. In a tractor, the combination of a main frame, a pair of tractor trucks to support the main frame arranged at opposite sides thereof, each tractor truck including a truck frame and an endless track thereon, the truck frames being pivotally connected at opposite portions thereof with the main frame to permit independent vertical swinging movement of said truck frames, and a strut free of the main frame and having flexible connections at its ends with the truck frames at opposite portions thereof to one side of the pivotal connections of the truck frames with the main frame providing for angular movement of the strut vertically relatively to the truck frames in the vertical swinging movement of the truck frames relatively to each other.

2. In a tractor, the combination of a main frame, a pair of tractor trucks to support the main frame, arranged at opposite sides thereof, each tractor truck including a truck frame and an endless track thereon, the truck frames being pivotally connected at opposite portions thereof with the main frame to permit independent vertical swinging movement of said truck frames, and a strut free of the main frame and having universal joint connections at its ends with the truck frames at opposite portions thereof to one side of the pivotal connections of the truck frames with the main frame providing for angular movement of the strut relatively to the truck frames in the vertical swinging movement of the truck frames relatively to each other.

3. In a tractor, the combination of a main frame, a pair of tractor trucks to support the main frame arranged at opposite sides thereof, each tractor truck including a truck frame and an endless track thereon, the truck frames being pivotally connected at opposite portions thereof with the main frame for independent vertical swinging movement, and a strut free of the main frame and having universal joint connections at its ends with the truck frames at the inner sides thereof to one side of the pivotal connections of said truck frames with the main frame.

4. In a tractor, the combination of a main frame, a pair of tractor trucks to support the main frame arranged at opposite sides thereof, each tractor truck including a truck frame and an endless track thereon, the truck frames being pivotally connected at their rear portions with rear portion of the main frame to permit independent vertical movement of the forward portions of the truck frames, a strut free of the main frame and flexibly connected at its ends with the truck frames at the front portions thereof, and inclined brace members pivotally connected at their inner ends to the rear portion of the main frame centrally of the sides thereof and extending forwardly therefrom, and being secured at their outer ends to the trucks frames at the front end portions thereof.

5. In a tractor, the combination of a main frame, a pair of tractor trucks to support the main frame arranged at opposite sides thereof, each tractor truck including a truck frame and an endless track thereon, the truck frames being pivotally connected at their rear portions with the rear portions of the main frame for vertical oscillation, an equalizer member pivotally connected centrally of its ends with the main frame at the forward part thereof and flexibly connected at its ends with the truck frames, and a strut interposed between and having universal joint connections at its ends with the truck frames at the front portions thereof.

6. In a tractor, the combination of a main frame, a pair of tractor trucks to support the main frame arranged at opposite sides thereof, each tractor truck including a truck frame and an endless track thereon, the truck frames being pivotally connected at their rear portions with the rear portions of the main frame for vertical oscillation, an equalizer member pivotally connected centrally of its ends with the main frame at the forward part thereof and flexibly connected at its ends with the truck frames, a strut free of the main frame and flexibly connected at its ends with the truck frames at the front portions thereof, and inclined brace members pivotally connected at their inner ends to the rear portion of the main frame centrally of the sides thereof, and extending forwardly therefrom and being rigidly connected with the truck frames at the front end portions thereof.

7. In a tractor, the combination of a main frame, a pair of tractor trucks to support the main frame arranged at opposite sides thereof, each tractor truck including a truck frame and an endless track thereon, the truck frames being pivotally connected at their rear portions with the main frame to permit independent vertical movement of the forward portions of the truck frames, and a strut free of the main frame and having universal joint connections at its ends with the truck frames at the front portions thereof.

8. In a tractor, the combination of a main frame, a pair of tractor trucks to support the main frame arranged at opposite sides thereof, each tractor truck including a truck frame and an endless track thereon, the truck frames being pivotally connected with the main frame to permit independent vertical swinging movement of the truck frames, and a strut member free of the main frame and having resilient universal joint connections at its ends with the truck frames.

9. In a tractor, the combination of a main frame, a pair of tractor trucks to support the main frame arranged at opposite sides thereof, each tractor truck including a truck frame and an endless track thereon, the truck frames being pivotally connected at their rear portions with the main frame to permit independent vertical movement of the forward portions of the truck frames, and a strut member interposed between and having ball and socket connections at its ends with the truck frames, each ball and socket connection including a socket composed of two parts, and means yieldably connecting the socket parts together.

10. In a tractor, the combination of a main frame, a pair of tractor trucks to support the main frame arranged at opposite sides thereof, each tractor truck including a truck frame and an endless track thereon, the truck frames being pivotally connected at opposite portions thereof with the main frame for independent vertical swinging movement, and a strut free of the main frame and having universal ball and socket joint connections at its ends with the truck frames to one side of the pivotal connections of the truck frames with the main frame.

11. In a tractor, the combination of a main frame, a pair of tractor trucks to support the main frame arranged at opposite sides thereof, each tractor truck including a truck frame and an endless track thereon, the truck frames being pivotally connected at opposite portions thereof with the main frame to permit independent vertical swinging movement of said truck frames, an equalizer member pivotally connected centrally of its ends with the main frame to one side of the pivotal connections of said truck frames with the main frame and flexibly connected at its ends with the truck frames, and a strut free of the main frame and having flexible connections at its ends with the truck frames at opposite portions thereof to one side of the pivotal connections of said truck frames with the main frame providing for angular movement of the strut relatively to the truck frames in the vertical swinging movement of the truck frames relatively to each other.

In testimony whereof I hereunto affix my signature.

CLARENCE LEO BEST.